United States Patent
Jones

[15] 3,675,358
[45] July 11, 1972

[54] FISHING LURE
[72] Inventor: Ferris E. Jones, 943 Millbury, La Puente, Calif. 91746
[22] Filed: Aug. 26, 1970
[21] Appl. No.: 67,153

[52] U.S. Cl. ........................................43/42.09
[51] Int. Cl. ........................................A01k 85/00
[58] Field of Search................................43/42.09

[56] References Cited

UNITED STATES PATENTS

| | | |
|---|---|---|
| 1,477,864 | 12/1923 | Bolton ..........................43/42.09 |
| 3,015,904 | 1/1962 | Trani ...........................43/42.09 |
| 2,127,639 | 8/1938 | Breuer ........................43/42.09 X |
| 2,570,100 | 10/1951 | Collins .........................43/42.09 |

Primary Examiner—Samuel Koren
Assistant Examiner—Daniel J. Leach
Attorney—Boniard I. Brown

[57] ABSTRACT

A composite fishing lure having separable interfitting bar and body parts releasably joined in a manner which permits either part to be easily replaced by a corresponding part of different color, color pattern, weight, shape, and/or size, adapted for a wide variety of fishing conditions. The body part is of channel shape to receive the bar therein and coupling rings are secured to each end of the bar for attaching a fishing line and hook thereto.

4 Claims, 5 Drawing Figures

PATENTED JUL 11 1972 3,675,358
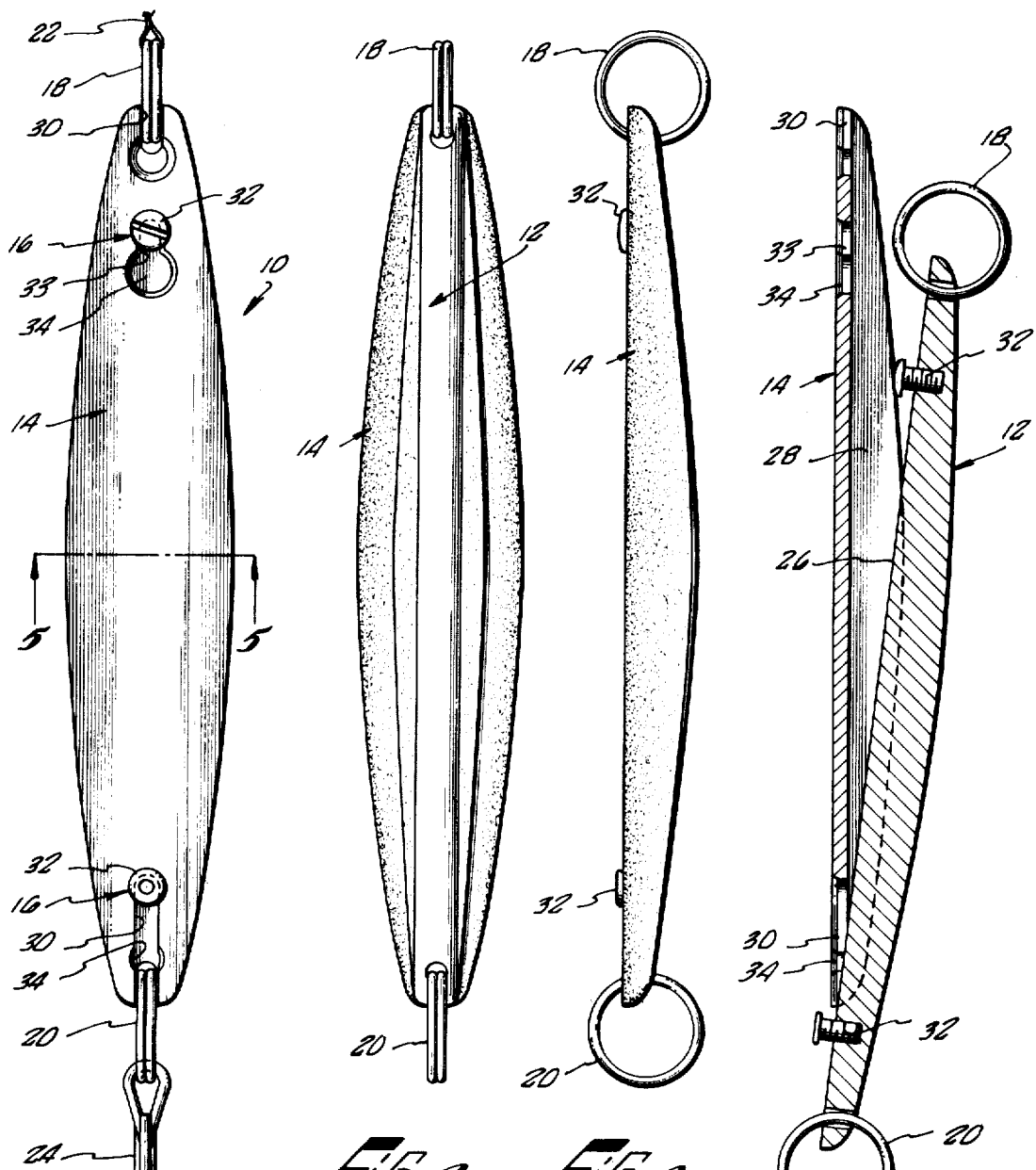
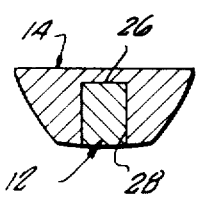
FIG. 1
FIG. 2
FIG. 3
FIG. 4
FIG. 5
INVENTOR.
FERRIS E. JONES
BY
Bernard J. Brown
ATTORNEY

FISHING LURE

BACKGROUND OF THE INVENTION

Field of the Invention

This invention relates generally to fishing aids and more particularly to a novel composite fishing lure whose overall size, shape, weight, color and/or color pattern may be easily varied to adapt the lure to a wide variety of fishing conditions.

Discussion of the Prior Art

Line fishing with an artificial lure, while a favorite recreation or sport of millions of persons throughout the world, is in reality quite a sophisticated art or science whose successful practice depends upon the use of the correct fishing lure for each particular fishing condition. In this regard, for example, it is well known by all knowledgable fishermen that different fishing conditions require different fishing lures for best results. Some of the fishing conditions which must be considered in selecting the best lure are weather and water conditions, time of the day and year, type of fish being caught, and the location and type of water body, i.e., lake, ocean, river, etc., which is being fished.

Generally speaking, a fishing lure has several characteristics which must be considered in selecting the best lure for each fishing situation. These characteristics are color, color pattern, size, shape, weight, and body motion of the lure through the water. The color, color pattern, size and shape of the lure are important from the standpoint of the visual appearance which the lure presents to the fish. The weight of the lure is important from the standpoint of predetermining the depth at which the lure will travel through the water. Finally, the body motion of the lure is important from the standpoint of simulating the motions of various forms of live bait. A skilled fisherman well versed in the art of fishing knows the best fishing lure characteristics for different fishing situations and provides himself with the proper fishing lures for the various fishing conditions he may encounter.

Most if not all existing fishing lures suffer from the disadvantage that each lure has a fixed color, color pattern, size, shape, and body motion and is thus best suited for only one, or at best only a limited number, of fishing conditions. Accordingly, for a fisherman to be prepared for a variety of fishing conditions he must carry a large number of different fishing lures. The disadvantages of such a large stock of lures is obvious. Thus, the lures are extremely costly to purchase, require extensive space for storage, and are heavy to carry. Moreover, changing from one type of lure to another requires removal of one lure from the fishing line and attachment of the new lure to the line. Finally, the hooks of the existing lures are generally permanently attached to and replaced with the lures. This provision of hooks on each lure greatly increases its cost and complicates the lure storage and handling difficulties.

SUMMARY OF THE INVENTION

The present invention overcomes the above-noted and other disadvantages of the existing fishing lures. To this end, the invention provides a composite fishing lure having separable parts which are releasably joined in a manner which permits either part to be replaced by a corresponding part of different size, shape, weight, color, and/or color pattern. The invention contemplates production of parts in sets each consisting of a number of corresponding parts of different color, color pattern, size, shape and/or weight but of essentially the same mating configuration, such that a relatively small number of mating parts may be assembled in a variety of combinations to produce a relatively large number of fishing lure of different overall color, color pattern or combination, size, shape, and/or weight suitable for a vast number of fishing conditions.

The disclosed inventive embodiment, for example, has a weighted bar with fish line and hook attachment means at its ends, and a weighted shell-like lure body of generally channel shape in transverse cross-section and having a longitudinal cavity in one side receiving the bar. The bar is relatively narrow so that its exposed side presents a narrow stripe along the body. According to the invention, each part of the lure, i.e., the body and bar, is produced in a set consisting of a number of corresponding parts which differ in at least color, color pattern and weight. However, the several parts of the two sets maintain the same mating configuration such that they may be assembled in a variety of combinations to provide a large number of different lures suitable for a great variety of different fishing conditions with a small number of lure parts. If desired, the size and/or shape of the lure parts in the sets may be varied, so long as their mating configuration is maintained, to further increase the possible lure configurations.

BRIEF DESCRIPTION OF THE DRAWINGS

FIG. 1 is a plan view of one side of a composite fishing lure according to the invention;

FIG. 2 is a plan view of the opposite side of the lure;

FIG. 3 is a side view of the lure;

FIG. 4 is a longitudinal section through the lure illustrating the manner of assembling and disassembling its separable parts; and FIG. 5 is a section taken on line 5—5 in FIG. 1.

DESCRIPTION OF THE PREFERRED EMBODIMENT

The illustrated fishing lure 10 has separable parts 12 and 14 releasably joined by fastening means 16. Part 12 has front and rear ends with means 18 and 20 for attachment to a fishing line 22 and a hook 24, respectively. As explained below, the fastening means 16 are releasable to permit easy separation or disassembly of the lure parts 12, 14 for replacement of either part by a corresponding part of different size, shape, weight, color, and/or color pattern. A large number of different fishing lures may thus be assembled from a small number of lure parts.

Referring in greater detail to the particular fishing lure 10 selected for illustration, the lure part 12 comprises a weighted bar of generally uniform rectangular cross-section from end to end. The line and hook attachment means 18, 20 are rings which pass through holes in the ends of the bar in planes normal to edge faces 26 of the bar. The fishing line 22 is attached to the front ring 18. The rear ring 20 passes through the eye of the hook 24.

The remaining part 14 of the lure is a weighted shell-like body of generally channel shape in transverse cross-section. Entering one side of the body is a longitudinal slot-like cavity 28 which is sized to slidably receive the bar 12. As shown in FIG. 5, the bar 12 has the same length as the body 14 and fits within the body cavity 28 to a depth such that the exposed edge face 26 of the bar is flush with the adjacent surface of the body 14. The bar is relatively narrow compared to the width of the body, such that its exposed face 26 presents the appearance of a narrow stripe extending endwise of the body.

Entering the ends of the body 14 are slots 30. These slots provide clearance slots for and receive the bar rings 18, 20 when the body and bar 12 are assembled. Fastening means 16 comprise a pair of headed threaded fasteners or screws 32. One screw passes through one body end slot 30 and is threaded in the bar 12. The other fastener passes through a third longitudinal slot 33 in the body 14, between its end slots 30, and is threaded in the bar 12. The screw heads engage over the edges of their slots to firmly clamp the bar and body together when the screws are tightened. The screw slots 30, 33 are effectively keyhole slots having enlarged openings 34 through which the screw heads may pass to permit assembly and disassembly of the body and bar in the manner shown in FIG. 5 when the screws are released.

According to the present invention, each part of the lure 10, i.e., the bar 12 and body 14, is made in sets each consisting of a number of the respective parts which differ in at least color, color pattern, and/or weight, such that the parts of the two sets may be assembled in various combinations to produce a variety of lures of different overall color, color pattern, and/or weight. If desired, the size, such as width, and/or shape of the lure parts, may be varied.

By way of example, a typical lure set according to the invention may be composed of sets of differing bars and bodies, as follows:

Each bar set may consist of bars constructed of different materials providing the following three bar weight classifications:

Light — Aluminum or alloy
Medium — Ferrous metal alloy
Heavy — Brass

Each weight classification may contain a number of bars having different basic colors, such as chrome, white, yellow, green, blue, or others, in solid colors or color combinations.

Similarly each body set may consist of bodies constructed of different materials providing the following three body weight classifications:

Light — Plastic
Medium — Aluminum
Heavy — Ferrous metal or brass

Each weight classification may contain a number of bodies having different basic colors, such as white, yellow, chrome, green or others in solid colors or color combinations.

It fishing lures, be immediately evident that the bar and body parts of a typical lure set according to the invention may be assembled in various combinations to create a vast assortment of fishing lures, suitable for a great variety of fishing conditions. Of primary importance in this regard is the fact that a large number of different lures may be produced from a small number of parts. For example, assuming a lure set consisting of bars and bodies of three different weight classifications and each weight classification containing bars or bodies, as the case may be, of six different basic colors, the bars and bodies may be assembled in 54 combinations to produce 54 different fishing lures. Additional lure variations may be provided by varying the size, such as width, and/or shape of at least the bodies. Varying the width of the lure body effects its body motion through the water to provide further lure possibilities. For example, a narrow body will create an erratic or jerky body motion when the lure is pulled. This motion is effective when water is cool and fish are moving about rapidly. A medium width body creates a relatively regular body motion suitable for when fish are feeding or moving slowly and best for all-around fishing. A wide body produces an inconsistent body motion and is easily effected by water currents. This width is best when fish are feeding or sluggish and slow moving and the water is quite warm.

This ability to create a large number of different lures from a small number of parts obviously greatly reduces the effective cost of the lures as compared to an equivalent number of the existing one-piece lures. Also, the number of separate items, i.e., bars and bodies, which may be stored and their weight, for a given number of lure combinations, is greatly reduced compared to an equivalent number of one-piece lures.

Another advantage of the invention is that the lure body may be replaced without detaching the fishing line and hook. This permits a relatively large number of lure combinations to be assembled with maximum ease and speed.

The fishing lure of the invention is ideal for all game fish and for both fresh and salt water fishing.

What is claimed as new in support of Letters Patent is:

1. A composite fishing lure comprising:
   two separable parts,
   one of said parts comprising an elongate bar having front and rear ends and the other part comprising an elongate shell like body of generally channel shape in transverse cross section having a longitudinal cavity in one side receiving said bar, coupling rings passing through holes in the ends of said bar for attaching a fishing line to said front bar end and a hook to said rear bar end,
   said body having longitudinal slots entering its ends for clearing said rings, and
   fastening means releasably joining said parts, whereby either part may be replaced by a corresponding part differing from the original replaced part in at least one of the following characteristics: size, shape, weight, color, or color pattern, whereby a relatively small number of lure parts may be combined in various combinations to provide a relatively large number of fishing lures of different overall size, weight, shape, color, and/or color pattern adapted for a wide variety of fishing conditions.

2. A fishing lure according to claim 1 wherein:
   said fastening means comprises at least one fastener threaded in said bar and passing through one of said slots.

3. A fishing lure according to claim 2 wherein:
   said fastening means comprises a third longitudinal slot in said body between said end slots, and a fastener threaded in said bar and passing through said third slot,
   said fasteners having enlarged heads engageable over the edges of their respective slots to hold said parts in assembled relation, and said slots comprising keyhole slots having enlarged portions sized to pass said fastener heads to permit separation of said parts.

4. A fishing lure comprising:
   two separable parts including an elongate bar and an elongate shell-like body of generally channel shape in transverse cross section having an open-ended cavity in one side receiving said bar,
   fastening means releasably joining said parts, whereby either part may be replaced by a corresponding part differing from the original replaced part in at least one of the following characteristics: size, shape, weight, color or color pattern, whereby a relatively small number of lure parts may be combined in various combinations to provide a relatively large number of fishing lures of different overall size, weight, shape, color, and/or color pattern adapted for a wide variety of fishing conditions, said fastening means comprising key hole slots in said body and headed fasteners on said bar extending through said slots and removable from and re-engageable in said slots by relative longitudinal movement of said bar and body, and
   means on the ends of said bar for connection to a fishing line and hook, respectively.

* * * * *